US012776820B2

(12) United States Patent
Turtinen et al.

(10) Patent No.: US 12,776,820 B2
(45) Date of Patent: Oct. 27, 2026

(54) TRIGGERING BEAM FAILURE RECOVERY UPON SECONDARY CELL GROUP ACTIVATION

(71) Applicant: NOKIA TECHNOLOGIES OY, Espoo (FI)

(72) Inventors: Samuli Heikki Turtinen, Ii (FI); Tero Henttonen, Espoo (FI); Jarkko Tuomo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 232 days.

(21) Appl. No.: 18/683,415

(22) PCT Filed: Aug. 4, 2022

(86) PCT No.: PCT/EP2022/071963
§ 371 (c)(1),
(2) Date: Feb. 13, 2024

(87) PCT Pub. No.: WO2023/020852
PCT Pub. Date: Feb. 23, 2023

(65) Prior Publication Data

US 2024/0357385 A1 Oct. 24, 2024

(30) Foreign Application Priority Data

Aug. 16, 2021 (FI) ..................................... 20215859

(51) Int. Cl.
*H04B 7/06* (2006.01)
*H04W 24/04* (2009.01)
*H04W 74/0833* (2024.01)

(52) U.S. Cl.
CPC ........ *H04B 7/06964* (2023.05); *H04W 24/04* (2013.01); *H04W 74/0833* (2013.01)

(58) Field of Classification Search
CPC .............. H04B 7/06964; H04W 24/04; H04W 74/0833
See application file for complete search history.

(56) References Cited

U.S. PATENT DOCUMENTS

2019/0215048 A1* 7/2019 Cirik ................. H04W 56/0045
2020/0100154 A1 3/2020 Cirik et al.
2020/0350972 A1 11/2020 Yi et al.
2021/0013951 A1 1/2021 Chen et al.
2021/0159967 A1* 5/2021 Cirik ....................... H04L 5/001
(Continued)

FOREIGN PATENT DOCUMENTS

CA 3056608 A1 3/2020
EP 3 735 036 A1 11/2020
(Continued)

OTHER PUBLICATIONS

Notice of Acceptance for Australian Application No. 2022331010 dated Oct. 15, 2025, 3 pages.
(Continued)

*Primary Examiner* — Kenny S Lin
(74) *Attorney, Agent, or Firm* — ALSTON & BIRD LLP

(57) ABSTRACT

Disclosed is a method comprising triggering, in response to activating a secondary cell group, if one or more pre-defined conditions are fulfilled, a beam failure recovery procedure for at least one cell of the secondary cell group.

23 Claims, 8 Drawing Sheets

(56) References Cited

U.S. PATENT DOCUMENTS

| | | | | |
|---|---|---|---|---|
| 2021/0175955 | A1 | 6/2021 | Kung et al. | |
| 2021/0250794 | A1 | 8/2021 | Wei et al. | |
| 2022/0353914 | A1* | 11/2022 | Zhang | H04W 24/08 |
| 2022/0394583 | A1* | 12/2022 | Deenoo | H04W 76/20 |

FOREIGN PATENT DOCUMENTS

| | | | |
|---|---|---|---|
| EP | 4 002 908 | A1 | 5/2022 |
| WO | 2019/184629 | | 10/2019 |
| WO | 2020/061955 | A1 | 4/2020 |
| WO | WO 2021/013150 | A1 | 1/2021 |
| WO | WO 2021/067236 | A1 | 4/2021 |
| WO | WO 2023/013460 | A1 | 2/2023 |

OTHER PUBLICATIONS

Examination Report for Australian Application No. 2022331010 dated Oct. 16, 2024, 5 pages.
CATT, "Further Considerations on Efficient SCG Activation/Deactivation", 3GPP TSG-RAN WG2 Meeting #113 electronic, R2-2101235, (Jan. 25-Feb. 5, 2021), 6 pages.
Notice of Reasons for Refusal for Japanese Application No. 2024-509017 dated Feb. 20, 2025, 7 pages.
Office Action for Canadian Application No. 3,228,990 dated Feb. 17, 2025, 4 pages.
Office Action for Chilean Application No. 202400426 dated Mar. 12, 2025, 24 pages.
Qualcomm Incorporated, "UE behaviour in SCG deactivated state", 3GPP TSG-RAN WG2 Meeting #113-e, R2-2101871, (Jan. 25-Feb. 5, 2021), 8 pages.
Samsung, "Multi TRP Beam Failure Detection and Recovery", 3GPP TSG-RAN2 Meeting #115 Electronic, R2-2107007, (Aug. 9-27, 2021), 7 pages.
Sharp, "Discussion for UE behaviour in deactivated SCG", 3GPP TSG-RAN WG2 Meeting #113 bis electronic, R2-2104124, (Apr. 12-20, 2021), 7 pages.
Office Action for Algerian Application No. DZ/P/2024/168 dated Jan. 30, 2025, 2 pages.
Notice of Reasons for Refusal for Japanese Application No. 2024-509017 dated Sep. 18, 2025, 6 pages.
Office Action for Chilean Application No. 202400426 dated Oct. 15, 2025, 20 pages.
"3rd Generation Partnership Project; Technical Specification Group Radio Access Network; NR; Medium Access Control (MAC) protocol specification (Release 16)", 3GPP TS 38.321 v16.5.0, (Jun. 2021), 157 pages.
"3rd Generation Partnership Project; Technical Specification Group Radio Access Network; NR; Medium Access Control (MAC) protocol specification (Release 17)", 3GPP TS 38.321 v17.0.0, (Mar. 2022), 221 pages.
"3rd Generation Partnership Project; Technical Specification Group Radio Access Network; NR; NR and NG-RAN Overall Description; Stage 2 (Release 17)", 3GPP TS 38.300 v17.0.0, (Mar. 2022), 204 pages.
"3rd Generation Partnership Project; Technical Specification Group Radio Access Network; NR; Radio Resource Control (RRC) protocol specification (Release 17)", 3GPP TS 38.331 v17.0.0, (Mar. 2022), 1221 pages.
"3rd Generation Partnership Project; Technical Specification Group Radio Access Network; NR; Radio Resource Control (RRC) protocol specification (Release 17)", 3GPP TS 38.331 v17.1.0, (Jun. 2022), 1273 pages.
Apple et al., "CR TP for 38.321 on MCG Failure Recovery in deactivated SCG", 3GPP TSG-RAN WG2 #117-e, R2-2204100, (Feb. 21-Mar. 3, 2022), 25 pages.
CMCC, "Discussion on BFR procedure in NR-U", 3GPP TSG-RAN WG2 #105, R2-1901971, (Feb. 25-Mar. 1, 2019), 3 pages.
Ericsson, "Efficient SCG (de)activation", 3GPP TSG-RAN WG3 Meeting #112-e, R3-211784, (May 17-27, 2021), 6 pages.
Ericsson, "On the need for random access during SCG activation", 3GPP TSG-RAN WG2 #113e, R2-2101095, (Jan. 25-Feb. 5, 2021), 11 pages.
Ericsson, "UE measurements and reporting in deactivated SCG", 3GPP TSG-RAN WG2 #115, R2-2108389, (Aug. 9-17, 2021), 10 pages.
ETSI MCC, "Report of 3GPP TSG RAN WG2 meeting #113-e, Online", 3GPP TSG-RAN WG2 meeting #113bis-e, R2-2102601, (Jan. 25-Feb. 5, 2021), 373 pages.
ETSI, "5G; NR; Medium Access Control (MAC) protocol specification", 3GPP TS 38.321 version 16.3.0, ETSI TS 138 321 v16.3.0, (Jan. 2021), 158 pages.
Huawei et al., "Corrections for further MRDC enhancements", 3GPP TSG-RAN WG2 Meeting #118-e, Change Request CR 3137, R2-2206266, (May 9-20, 2022), 79 pages.
Huawei et al., "UE behaviour on deactivated SCG", 3GPP TSG-RAN WG2 Meeting #113-e, R2-2101481, (Jan. 25-Feb. 5, 2021), 5 pages.
Huawei, "[Post111-e][919][eDCCA] Efficient activation deactivation of SCG Discussion on SCG deactivation and activation", 3GPP TSG-RAN WG2 #112-e, R2-2010123, (Nov. 2-13, 2020), 20 pages.
Huawei, "Revised WID on Further Multi-RAT Dual-Connectivity enhancements", 3GPP TSG RAN Meeting #88e, RP-201040, (Jun. 29-Jul. 3, 2020), 4 pages.
InfoNRLTE, "5G NR—4G LTE related technology insights", Retrieved via the Internet on Jan. 6, 2025, <URL:https://info-nrlte.com/tag/dual-connectivity/>, (May 9, 2020), 11 pages.
International Search Report and Written Opinion for Patent Cooperation Treaty Application No. PCT/EP2022/071963 dated Nov. 3, 2022, 18 pages.
Lenovo, "MAC related issues upon SCG activation and deactivation", 3GPP TSG-RAN WG2 Meeting #118-e, R2-2204956, (May 9-20, 2022), 6 pages.
Nokia et al., "Corrections to MAC regarding deactivated SCG", 3GPP TSG-RAN WG2 Meeting #118 Electronic, Change Request CR 1264, R2-2206379, (May 9-20, 2022), 15 pages.
Nokia et al., "Measurements on deactivated SCG", 3GPP TSG-RAN WG2 Meeting #115 Electronic, R2-2110555, (Aug. 16-27, 2021), 10 pages.
Notice of Allowance for Taiwanese Application No. 111130411 dated Nov. 30, 2023, 3 pages.
Office Action for Bangladesh Application No. 275/2022/175 dated Aug. 19, 2024, 1 page.
Office Action for Finland Application No. 20215859 dated Dec. 13, 2021, 8 pages.
Office Action for Taiwanese Application No. 111130411 dated Apr. 7, 2023, 22 pages.
OPPO, "Open issues for activation of deactivated SCG", 3GPP TSG-RAN WG2 Meeting #115 electronic, R2-2107019, (Aug. 16-27, 2021), 9 pages.
OPPO, "Summary of AI 8.2.2.2: UE measurements and reporting in deactivated SCG", 3GPP TSG-RAN WG2 Meeting #113 bis electronic, R2-2104316, (Apr. 12-20, 2021), 7 pages.
Qualcomm Incorporated, "UE measurements and reporting in deactivated SCG", 3GPP TSG-RAN WG2 Meeting #113-bis-e, R2-2103893, (Apr. 12-20, 2021), 9 pages.
Qualcomm, "Just in: 3GPP completes 5G NR Release 17", Retrieved via the Internet on Jan. 6, 2025, <URL:https://www.qualcomm.com/news/onq/2022/03/just-3gpp-completes-5g-nr-release-17>, (Mar. 23, 2022), 9 pages.
Techplayon, "5G NR BFR—Beam Failure Recovery", Retrieved via the Wayback Machine on Jan. 6, 2025, <URL:https://web.archive.org/web/20210731195727/https://www.techplayon.com/5g-nr-bfr-beam-failure-recovery/>, (Jul. 21, 2021), 11 pages.
Techplayon, "5GNR 2-Step RACH", Retrieved via the Wayback Machine on Jan. 6, 2025, <URL:https://web.archive.org/web/20210508062516/https://www.techplayon.com/5gnr-2-step-rach/>, (Apr. 8, 2021), 11 pages.
Telecomhall, "Whats is the difference between DC (Dual Connectivity and CA (carrier Aggregation)?", Retrieved via the Internet on Jan. 6, 2025, <URL:https://www.telecomhall.net/t/whats-is-the-difference-between-dc-dual-connectivity-and-ca-carrier-aggregation/8175>, (Jun. 2020), 16 pages.

(56) References Cited

OTHER PUBLICATIONS

Vivo, "Discussion on SCG activation/deactivation processing", 3GPP TSG-RAN WG2 Meeting #118 electronic, R2-2205060, (May 9-20, 2022), 15 pages.
ZTE Corporation et al., "Further consideration on SCG deactivation and activation", 3GPP TSG-RAN WG2 Meeting #113 electronic, R2-2100568, (Jan. 25-Feb. 5, 2021), 7 pages.
Decision to Grant for Japanese Application No. 2024-509017 dated Apr. 23, 2026, 4 pages.
Office Action for Argentina Application No. 20220102195 dated Oct. 8, 2025, 10 pages.
Office Action for Korean Application No. 10-2024-7009003 dated Mar. 23, 2026, 17 pages.
Office Action for Canadian Application No. 3,228,990 dated Jan. 27, 2026, 5 pages.
First Examination Report for Indian Application No. 202447010948 dated May 11, 2026, 8 pages.
Notice of Issuance for Chilean Application No. 2024-00426 dated Apr. 30, 2026, 2 pages.
Office Action for ARIPO Application No. A/P/2024/015530 dated Jun. 1, 2026, 4 pages.

* cited by examiner

TRIGGERING BEAM FAILURE RECOVERY UPON SECONDARY CELL GROUP ACTIVATION

CROSS-REFERENCE TO RELATED APPLICATIONS

The present application is a national phase entry of International Application No. PCT/EP2022/071963, filed Aug. 4, 2022, which claims priority to Finnish Application No. 20215859, filed Aug. 16, 2021, which are incorporated herein by reference in their entirety.

FIELD

The following exemplary embodiments relate to wireless communication.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: trigger, in response to activating a secondary cell group, if one or more pre-defined conditions are fulfilled, a beam failure recovery procedure for at least one cell of the secondary cell group.

According to another aspect, there is provided an apparatus comprising means for: triggering, in response to activating a secondary cell group, if one or more pre-defined conditions are fulfilled, a beam failure recovery procedure for at least one cell of the secondary cell group.

According to another aspect, there is provided a method comprising: triggering, in response to activating a secondary cell group, if one or more pre-defined conditions are fulfilled, a beam failure recovery procedure for at least one cell of the secondary cell group.

According to another aspect, there is provided a computer program comprising instructions for causing an apparatus to perform at least the following: triggering, in response to activating a secondary cell group, if one or more pre-defined conditions are fulfilled, a beam failure recovery procedure for at least one cell of the secondary cell group.

According to another aspect, there is provided a computer program product comprising program instructions which, when run on a computing apparatus, cause the computing apparatus to perform at least the following: triggering, in response to activating a secondary cell group, if one or more pre-defined conditions are fulfilled, a beam failure recovery procedure for at least one cell of the secondary cell group.

According to another aspect, there is provided a computer readable medium comprising program instructions for causing an apparatus to perform at least the following: triggering, in response to activating a secondary cell group, if one or more pre-defined conditions are fulfilled, a beam failure recovery procedure for at least one cell of the secondary cell group.

According to another aspect, there is provided a non-transitory computer readable medium comprising program instructions for causing an apparatus to perform at least the following: triggering, in response to activating a secondary cell group, if one or more pre-defined conditions are fulfilled, a beam failure recovery procedure for at least one cell of the secondary cell group.

According to another aspect, there is provided an apparatus comprising at least one processor, and at least one memory including computer program code, wherein the at least one memory and the computer program code are configured, with the at least one processor, to cause the apparatus to: transmit, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided an apparatus comprising means for: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a method comprising: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a computer program comprising instructions for causing an apparatus to perform at least the following: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a computer program product comprising program instructions which, when run on a computing apparatus, cause the computing apparatus to perform at least the following: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a computer readable medium comprising program instructions for causing an apparatus to perform at least the following: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a non-transitory computer readable medium comprising program instructions for causing an apparatus to perform at least the following: transmitting, to a terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group.

According to another aspect, there is provided a system comprising at least a terminal device and a network element of a wireless communication network. The network element is configured to: transmit, to the terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group. The terminal device is configured to: receive, from the network element, the message indicative of the configuration; and trigger, in response to activating the secondary cell group, if the one or more pre-defined conditions are fulfilled, the beam failure recovery procedure for the at least one cell of the secondary cell group.

According to another aspect, there is provided a system comprising at least a terminal device and a network element of a wireless communication network. The network element comprises means for: transmitting, to the terminal device, a message indicative of a configuration for beam failure recovery associated with a secondary cell group, wherein the configuration indicates to trigger, if one or more pre-defined conditions are fulfilled, a beam failure recovery procedure for at least one cell of the secondary cell group in response to activating the secondary cell group. The terminal device comprises means for: receiving, from the network element, the message indicative of the configuration; and triggering, in response to activating the secondary cell group, if the one or more pre-defined conditions are fulfilled, the beam failure recovery procedure for the at least one cell of the secondary cell group.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
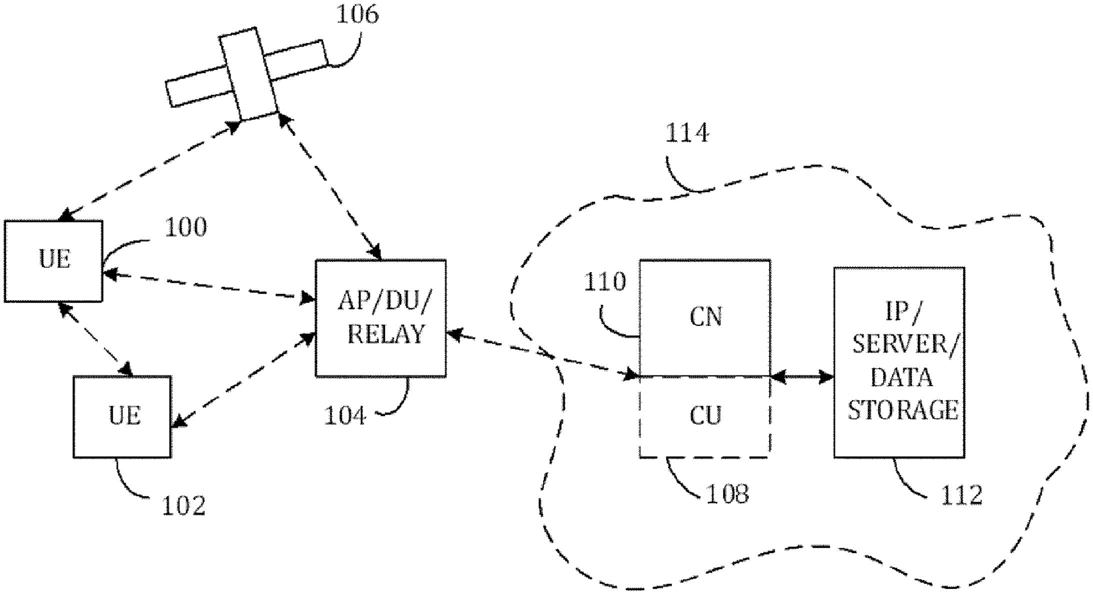
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IOT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6GHz-cmWave, below 6GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto-or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Figure 2:
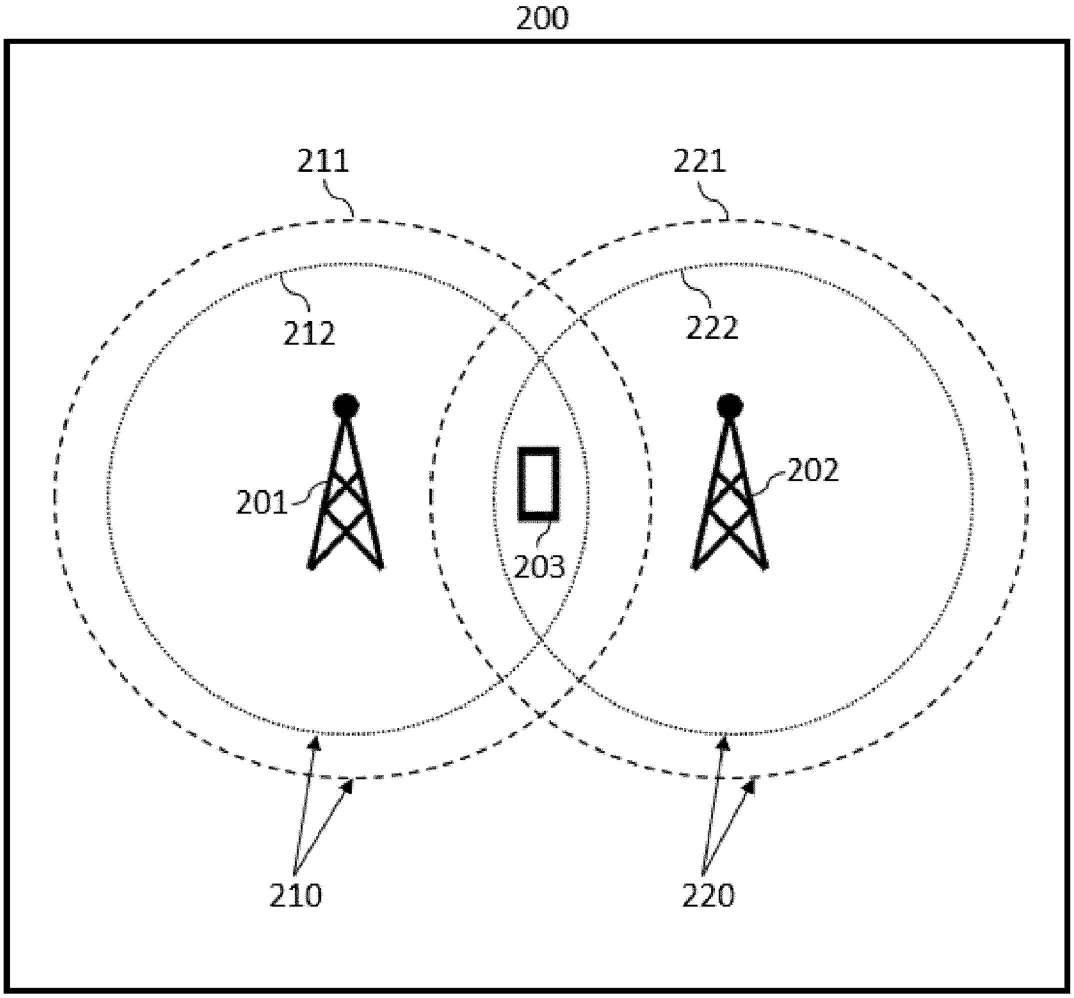
FIG. 2 illustrates an example of a wireless communication system, to which some exemplary embodiments may be applied.

FIG. 2 illustrates an example of a wireless communication system 200, to which some exemplary embodiments may be applied. At least portions of the wireless communication system 200 may be configured for implementing carrier aggregation in dual connectivity (DC). Dual connectivity enables a UE 203 to be simultaneously connected to two cell groups: a master cell group (MCG) 210 and a secondary cell group (SCG) 220. Dual connectivity may be combined with carrier aggregation, and there may be multiple cells (for example one per aggregated carrier) in a given cell group. The two cell groups may be associated with different RAN nodes 201, 202 (i.e., base stations). The two cell groups may be based on different radio access technologies (e.g., LTE and 5G), or they may be based on the same radio access technology.

The MCG 210 is a group of serving cells associated with the master node 201 (i.e., a RAN node providing the control plane connection to the core network). The MCG 210 comprises a primary cell (PCell) 211, i.e. a special cell (SpCell) of the MCG 210, and optionally one or more secondary cells (SCells) 212. The PCell 211 is a cell operating on a primary frequency that may be used for initial access under the MCG 210. An SCell is a cell, operating on a secondary frequency, which may be configured once an RRC connection is established and which may be used to provide additional radio resources. A given serving cell may be associated with physical resources that may be coming from one or more actual transmission and reception points (TRPs), and the UE 203 may also be configured to utilize one or more TRPs. In such a case, the UE 203 may use resources from more than one cell per aggregated carrier or frequency.

The SCG 220 is a group of serving cells associated with the secondary node 202 (i.e., a RAN node providing additional resources to the UE). The SCG 220 comprises a primary secondary cell (PSCell) 221, i.e. SpCell of the SCG, and optionally one or more SCells 222. The PSCell 221 is a cell that may be used for initial access under the SCG 220.

The SCG may be deactivated for example based on the UE's expected data rate in uplink and/or downlink, and/or SCG activation latency, and/or UE power consumption, and/or the radio bearers on which the UE or base station has data to transmit. In the SCG deactivated state, the PSCell and all SCG SCells may be deactivated. For example, if the UE's expected data rate is low (e.g., below a threshold) but the network wants to be able to use the SCG quickly when the data rate increases, then the SCG may be deactivated, since the additional radio resources of the SCG are not needed at this moment. As another example, if the UE's expected data rate is concentrating on signalling/data radio bearers associated with the MCG (e.g., there is no or only little data on radio bearers associated with the SCG), then the SCG may be deactivated, since the additional radio resources of the SCG may not be needed at this moment. Deactivating the SCG may refer to deactivating the data transmissions between the UE and the SCG. The UE may still remain in RRC connected mode with the SCG in the SCG deactivated state. In the SCG deactivated state, the PSCell may continue to perform, for example, measurement monitoring and/or beam tracking with a cycle that may be different compared to the activated state, but physical uplink control/shared channel (PUCCH/PUSCH) transmissions and physical downlink control/shared channel (PDCCH/PDSCH) reception with the UE may be disabled. When the SCG is activated, at least the PSCell is activated (i.e., data transmissions between the UE and the PSCell are enabled), while the SCG SCells may remain in deactivated state. Alternatively, some or all of the SCG SCells may also be activated. Activation and/or deactivation of the SCG may be performed via an explicit activation/deactivation command from the network, or implicitly for example based on a timer, or autonomously by the UE based on one or more internal triggers, such as a data rate threshold, or a data appearance on one or more radio bearers associated with the SCG, etc.

Beamforming is a signal processing technique used for example in 5G communication to allow a base station to transmit targeted directional radio signals (beams) to UEs, thus reducing interference and making more efficient use of the frequency spectrum with improved spectral efficiency.

When a UE is moving or located indoors, the radio link between the UE and base station is susceptible to blockage and degradation of the radio signal, which may suddenly interrupt the communication link and result in beam failure. In order to detect the beam failure at the right time, the UE may perform a beam failure detection (BFD) procedure to measure such sudden and rapid changes in the communication link. For example, if the physical layer (i.e., L1) detects that a reference signal received power (RSRP) measured on the reference signal of the serving beam goes below a threshold, then a beam failure instance (BFI) may be triggered and sent to the MAC layer. As another example, if the physical layer (i.e., L1) detects that a target block error rate (BLER) measured on the physical downlink control channel (PDCCH) of the serving beam goes above a threshold, then a beam failure instance (BFI) may be triggered and sent to the MAC layer. The MAC layer starts a timer (beamFailureDetectionTimer), when it receives the BFI, and keeps incrementing a BFI counter (BFL_COUNTER) by 1 for every BFI. When a certain threshold of BFI (beamFailureInstanceMaxCount) is reached, the MAC layer triggers a beam failure and starts a beam failure recovery (BFR) procedure.

The BFR procedure enables the UE to recover from the beam failure and continue the services. When a beam failure occurs, the UE loses the link from one beam, but it may be able to establish a link to another beam during the BFR procedure. The BFR for SpCell may be performed via a random-access (RA) procedure, while the BFR for SCells may use MAC control element (MAC CE) based reporting. The UE may identify a new candidate beam which can be informed to the base station via RA procedure (SpCell) or MAC CE (SCell).

During the RA procedure, the UE may transmit a random-access preamble to the SpCell via the physical random-access channel (PRACH) in order to obtain uplink synchronization as well as to indicate the candidate beam. There are at least two types of RA procedure: contention-based random access (CBRA) and contention-free random access (CFRA). CFRA may also be referred to as non-contention based random access. In CFRA, the UE has a dedicated random-access preamble allocated by the network, whereas in CBRA the UE selects the preamble randomly from a pool of preambles shared with other UEs in the cell. In CBRA, the contention (or collision) may occur, if two or more UEs attempt the random-access procedure by using the same random-access procedure on the same resource. The network may transmit a random-access response to the UE in response to the random-access preamble received from the UE. The random-access response (RAR or Msg2) may comprise the timing advance (TA) information that was defined by the network based on the random-access preamble (Msg1) received from the UE.

According to legacy specifications, for a given serving cell configured for BFD, if a BFI indication has been received from lower layers, the MAC entity may start or restart a timer called beamFailureDetectionTimer, and increment a beam failure instance (BFI) counter called BFI_COUNTER by 1. In other words, BFI_COUNTER counts the number of BFIs. If the BFI_COUNTER is larger than or equal to a threshold value called beamFailureInstanceMaxCount, then a beam failure may be considered to be detected and a BFR may be triggered for this serving cell, if the serving cell is an SCell. If the serving cell is not an SCell, then a random-access procedure may be initiated on the SpCell.

The timer beamFailureDetectionTimer and the threshold value beamFailureInstanceMaxCount may be defined, for example, as follows:

```
beamFailureInstanceMaxCount          ENUMERATED {n1, n2, n3, n4,
n5, n6, n8, n10}                       OPTIONAL, -- Need R
   beamFailureDetectionTimer             ENUMERATED {pbfd1, pbfd2,
pbfd3, pbfd4, pbfd5, pbfd6, pbfd8, pbfd10}   OPTIONAL, -- Need R
```

beamFailureDetection Timer is a timer for BFD. The value of the timer is a number of $Q_{out,LR}$ reporting periods of a beam failure detection reference signal. For example, value pbfd1 corresponds to 1 $Q_{out,LR}$ reporting period of the beam failure detection reference signal, value pbfd2 corresponds to 2 $Q_{out,LR}$ reporting periods of the beam failure detection reference signal, and so on.

The value of the BFI threshold beamFailureInstanceMaxCount defines after how many beam failure instances the UE triggers BFR. For example, value n1 corresponds to 1 BFI, value n2 corresponds to 2 BFIs, and so on.

The BFD and BFR procedures may be used, for example, in frequency range 2 (FR2) operation, frequency range 1 (FR1) operation, or any other current or future frequency range. FR1 is from 450 MHz to 6 GHz. FR2 is from 24.25 GHz to 52.6 GHz.

NR Rel-17 may provide support for performing BFD while SCG is deactivated. If the time alignment timer (TAT) is maintained or still running after the SCG deactivation, and no beam failure has been detected, then a random-access procedure may not be needed upon SCG activation (i.e., the UE may activate the PSCell without random access in this case). Otherwise, the random-access procedure may be performed. The TAT may be used to control how long the UE is considered to be uplink time aligned. The UE may start or restart the TAT upon receiving a timing advance command from the network.

If BFD is performed while the SCG is deactivated, it may be beneficial to allow the BFR procedure to be performed in order to inform the network about the failed beam. However, if there is no data activity that needs the SCG to be activated, then it may be unnecessary to perform the BFR immediately upon detecting the beam failure, since it may cause the network to interpret the BFR as SCG activation, which may unnecessarily increase UE power consumption and network resource consumption.

Some exemplary embodiments provide a mechanism, wherein BFR is not triggered in case BFI_COUNTER is equal to or higher than the BFI threshold (beamFailureInstanceMaxCount), while the SCG is deactivated. BFR may be triggered by the UE in case the BFI_COUNTER is equal to or higher than the BFI threshold (beamFailureInstanceMaxCount) upon SCG activation, or in case the beamFailureDetection Timer is still running upon SCG activation (e.g., if the beam failure was detected while the SCG was deactivated).

Figure 3:
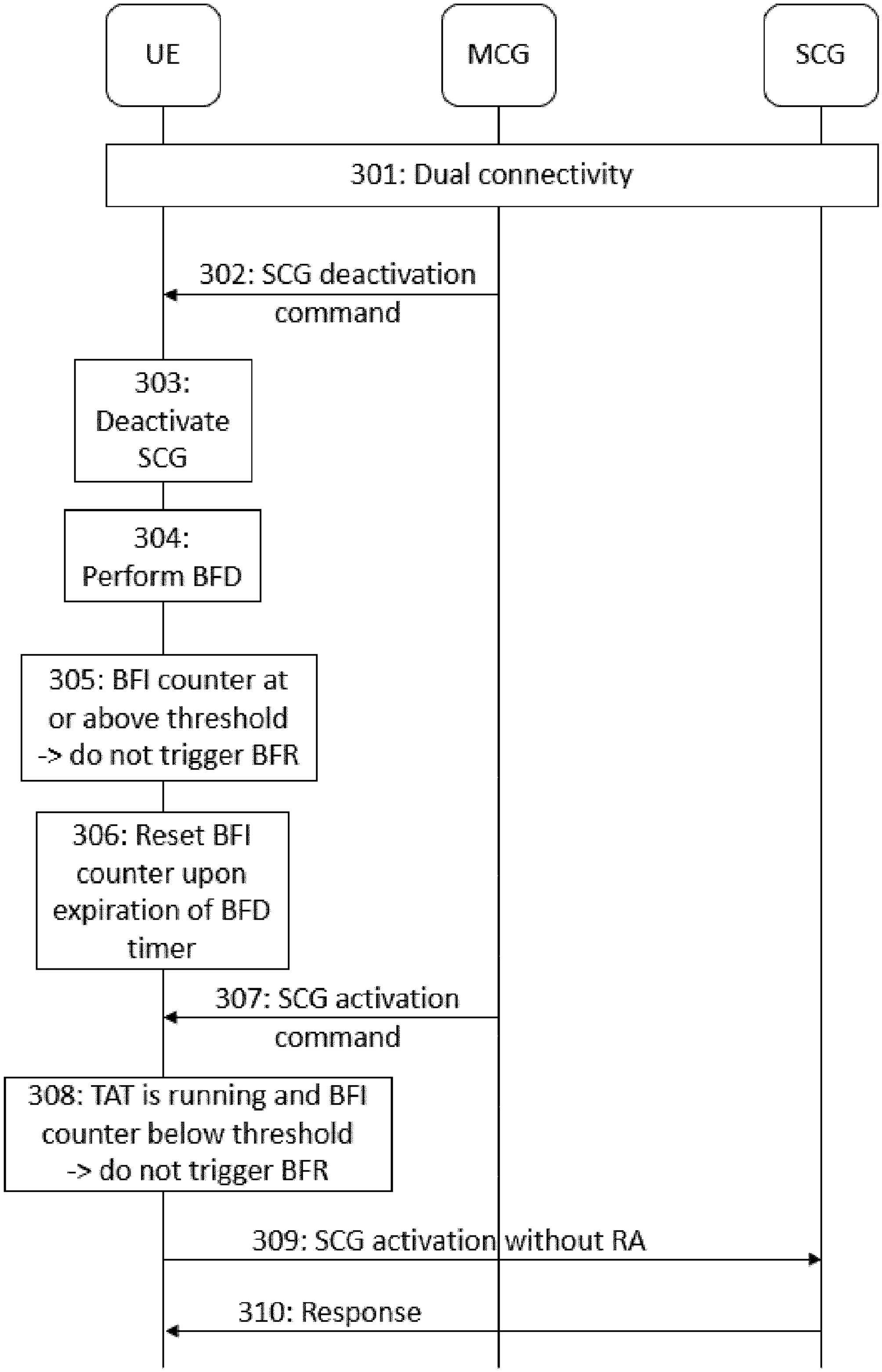
FIGS. 3-4 illustrate signaling diagrams according to some exemplary embodiments.

FIG. 3 illustrates a signaling diagram according to an exemplary embodiment, wherein BFR is not triggered upon SCG activation, if one or more pre-defined conditions are not fulfilled. The signaling illustrated in FIG. 3 may be performed in the wireless communication system shown in FIG. 2, for example.

Referring to FIG. 3, a UE is configured 301 for dual connectivity with an MCG and an SCG. The MCG is hosted by a master node and the SCG is hosted by a secondary node. The master node may also be referred to as a first base station, and the secondary node may also be referred to as a second base station. The UE may engage in data transmission (uplink and/or downlink) with the MCG. The UE may also engage in data transmission (uplink and/or downlink) with the SCG (i.e., the SCG may initially be in an activated state).

The master node transmits 302 an SCG deactivation command to the UE via the MCG. Alternatively, the secondary node may transmit the SCG deactivation command 302 to the UE via the SCG. The SCG deactivation command indicates a request for the UE to switch from the SCG activated state to the SCG deactivated state. The decision to deactivate the SCG may be performed at the master node or at the secondary node, and it may be based on a data amount comparison or a comparison of expected traffic rate. For example, the master node or secondary node may decide to deactivate the SCG, if the data amount is less than a first threshold, and/or if the traffic rate is less than a second threshold, and/or the network wants to allow low latency for SCG activation. The term "data amount" may refer to an amount of data that has been or will be transferred between the UE and the SCG. Similarly, the term "traffic rate" may refer to the rate of data traffic that has been or will be transferred between the UE and the SCG. Similarly, the term "low latency" may refer to the network knowing the UE capability to deactivate the SCG. The master node may also transmit an SCG deactivate request to the secondary node, and the secondary node may deactivate the context of the UE at the SCG in response to the received request. The SCG deactivate request may also be referred to as a secondary node (SN) modification request.

In response to receiving the SCG deactivate command 302, the UE enters 303 the SCG deactivated state, wherein data transmissions with the SCG (in uplink and downlink) are deactivated. Data transmissions with respect to the MCG may continue in the SCG deactivated state.

The UE performs 304 BFD on a serving cell of the SCG, while in the SCG deactivated state. While in the SCG deactivated state, the UE does not initiate BFR, even if the UE determines 305 that the BFI_COUNTER is above or equal to the BFI threshold (beamFailureInstanceMaxCount). In other words, BFR is not triggered in case BFI_ COUNTER hits the threshold while the SCG is deactivated. The UE may reset 306 the BFI_COUNTER to 0, if the beamFailureDetectionTimer expires before SCG activation.

If the master node or secondary node determines that a current data amount is greater than the first threshold, and/or if the traffic rate is greater than the second threshold, and/or the network wants to enable better scheduling diversity via being able to schedule the UE from multiple serving cells, and/or the network determines availability of data, then the master node transmits 307 an SCG activation command to the UE via the MCG. Alternatively, the UE may request SCG activation from the master node, and the master node may transmit the SCG activation command to the UE in response to the request. The SCG activation command indicates a request for the UE to switch from the SCG deactivated state to the SCG activated state. The UE may switch to the SCG activated state upon receiving the SCG activation command. Alternatively, the UE may initiate the SCG activation based on an internal trigger at the UE, for example if the UE determines that a data amount exceeds a configured threshold, or data becomes available on a certain radio bearer(s), etc.

If the UE determines 308 that the TAT is still running (i.e., the TAT has not expired) 1) and the BFI_COUNTER is below the BFI threshold (beamFailureInstanceMaxCount) upon receiving the SCG activation command (or upon entering the SCG activated state), then the UE transmits 309 an SCG activation message to the secondary node without performing a random-access procedure to the PSCell of the SCG (i.e., without BFR). The SCG activation message indicates the switch to the SCG activated state. For example, a scheduling request may be used as the SCG activation message 309.

The secondary node may activate the context of the UE at the SCG in response to receiving the SCG activation message from the UE. The secondary node transmits 310 a response to the UE to confirm the reception of the UE activation message and thus also the switch to the SCG activated state. In the SCG activated state, data transmissions with the SCG are enabled (i.e., the UE may transfer data for example with the PSCell of the SCG).

Figure 4:
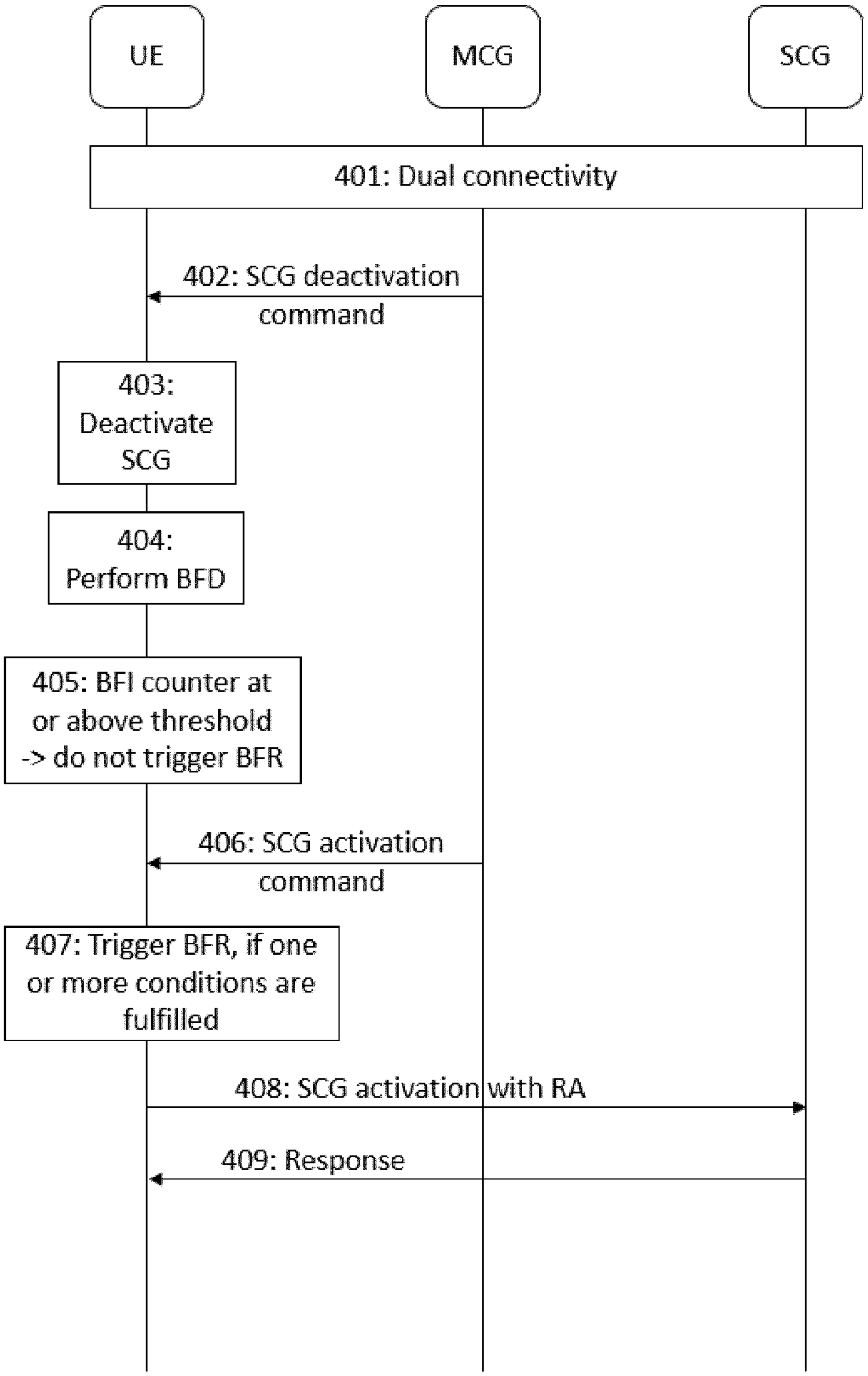

FIG. 4 illustrates a signaling diagram according to an exemplary embodiment, wherein BFR is triggered upon SCG activation, if one or more pre-defined conditions are fulfilled. The signaling illustrated in FIG. 4 may be performed in the wireless communication system shown in FIG. 2, for example.

Referring to FIG. 4, a UE is configured 401 for dual connectivity with an MCG and an SCG. The MCG is hosted by a master node and the SCG is hosted by a secondary node. The master node may also be referred to as a first base station, and the secondary node may also be referred to as a second base station. The UE may engage in data transmission (uplink and/or downlink) with the MCG. The UE may also engage in data transmission (uplink and/or downlink) with the SCG (i.e., the SCG may initially be in an activated state).

The master node transmits 402 an SCG deactivation command to the UE via the MCG. Alternatively, the secondary node may transmit the SCG deactivation command 402 to the UE. The decision to deactivate the SCG may be performed at the master node or at the secondary node. The master node may also transmit an SCG deactivate request to the secondary node, and the secondary node may deactivate the context of the UE at the SCG in response to the received request.

In response to receiving the SCG deactivate command 402, the UE enters 403 the SCG deactivated state, wherein data transmissions with the SCG (in uplink and downlink) are deactivated. Data transmissions with respect to the MCG may continue in the SCG deactivated state.

The UE performs 404 BFD on a serving cell (e.g., SpCell/PSCell) of the SCG, while in the SCG deactivated state. While in the SCG deactivated state, the UE does not initiate BFR, even if the UE determines 405 that the BFI_COUNTER is above or equal to the BFI threshold (beamFailureInstanceMaxCount). In other words, BFR is not triggered in case BFI_COUNTER hits the threshold (i.e., if a beam failure is detected), while the SCG is deactivated.

The UE may trigger, or cause, or consider, the TAT to be expired upon detecting a beam failure, while the UE is still in SCG deactivated state. Herein triggering the TAT to expire may refer to setting the value of the TAT to zero, for example. Alternatively, the UE may wait until the SCG activation before triggering, or causing, or considering, the expiration of the TAT. This allows the UE to recover the beam (if possible) while the SCG is deactivated, and if that happens while the TAT is running, the UE can still access the PSCell (i.e., SpCell of the SCG) without performing a random-access procedure. However, if the beam is still failed at the time of SCG activation, the TAT expiration forces the UE to perform a random-access procedure to do BFR for the PSCell. Whether the TAT is triggered to expire in the SCG deactivated state or later at SCG activation may be configured by the network, or it may be a pre-configured UE capability.

The master node transmits 406 an SCG activation command to the UE via the MCG. The UE may switch to the SCG activated state upon receiving the SCG activation command. The UE triggers 407, or determines to perform, the BFR procedure on the serving cell (e.g., SpCell) of the SCG in response to receiving the SCG activation command (or upon entering the SCG activated state), if one or more of the following pre-defined conditions are fulfilled: 1) if the BFI_COUNTER is above or equal to the BFI threshold (e.g., beamFailureInstanceMaxCount) upon SCG activation, 2) if the UE has previously detected a beam failure in step 405 and the beam failure detection timer (e.g., beamFailureDetectionTimer) is still running upon SCG activation, 3) if the UE triggers expiration of the TAT upon SCG activation due to the beam failure detected previously in step 405, and/or 4) if the TAT is expired upon SCG activation (e.g., it may have expired previously during step 405).

The UE transmits 408 an SCG activation message to the secondary node, and performs a random-access procedure to the PSCell of the SCG (i.e., SCG activation with BFR). For example, CBRA may be used as the random-access procedure for BFR. Alternatively, CFRA may be used as the random-access procedure for BFR, if CFRA BFR resources, such as a dedicated preamble, have been configured for the UE.

The secondary node may activate the context of the UE at the SCG in response to receiving the SCG activation message from the UE. The UE receives 409 a response from the secondary node confirming the receipt of the SCG activation message and the switch to the SCG activated state. In the SCG activated state, data transmissions with the SCG are enabled, i.e., the UE may transfer data in uplink and downlink for example with the PSCell of the SCG. The response 409 may comprise a random-access response, which may comprise a timing advance command to be applied at the UE for uplink synchronization with the PSCell.

Figure 5:
FIGS. 5-11 illustrate flow charts according to some exemplary embodiments.

FIG. 5 illustrates a flow chart according to an exemplary embodiment. The functions illustrated in FIG. 5 may be performed by an apparatus such as, or comprised in, a terminal device (e.g., the UE 203 of FIG. 2). The apparatus may be configured for dual connectivity with an MCG and an SCG. Referring to FIG. 5, if one or more pre-defined conditions are fulfilled, a beam failure recovery procedure is triggered 501, or initiated, for at least one cell of the SCG in response to activating the SCG. The SCG may be activated in response to receiving an SCG activation command or indication from the network, or by triggering the SCG activation autonomously by the UE itself based on an internal trigger. The at least one cell may comprise at least one serving cell of the SCG. In other words, the at least one cell may comprise at least one of PSCell, SpCell and/or SCell of the SCG. During the beam failure recovery procedure, the apparatus may transmit a random-access preamble to the SpCell/PSCell of the SCG (if the SpCell/PSCell is a serving cell) in order to establish a link to a different beam than the beam on which the beam failure was detected.

For example, the one or more pre-defined conditions may comprise at least one of a first pre-defined condition and/or a second pre-defined condition.

The first pre-defined condition is fulfilled, if a beam failure instance counter (BFI_counter) associated with the at least one cell is above or equal to a beam failure instance threshold upon activating the SCG. The beam failure instance threshold may also be referred to as beamFailureInstanceMaxCount.

The second pre-defined condition may be fulfilled, if a beam failure detection timer associated with the at least one cell is running upon activating the SCG. The beam failure detection timer may also be referred to as beamFailureDetection Timer.

Alternatively, the second pre-defined condition may be fulfilled if a beam failure is detected on the at least one cell while the SCG is deactivated, and the beam failure detection timer is running upon activating the SCG.

Figure 6:
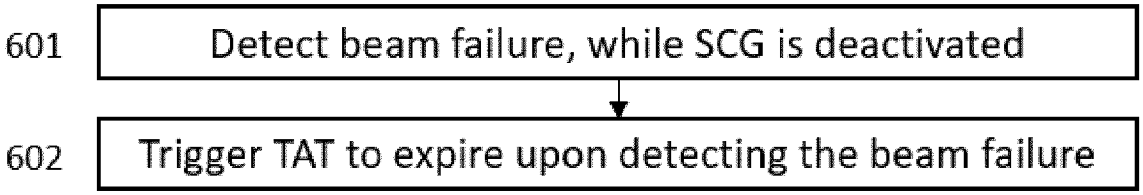

FIG. 6 illustrates a flow chart according to an exemplary embodiment, wherein a TAT is triggered to expire upon detecting a beam failure, while in SCG deactivated state. Thus, the UE may be forced to perform a random-access procedure with the serving cell of the SCG upon SCG activation, since the TAT is considered to be expired when the SCG is activated. The functions illustrated in FIG. 6 may be performed by an apparatus such as, or comprised in, a terminal device (e.g., the UE 203 of FIG. 2). Referring to FIG. 6, a beam failure is detected 601 on the at least one cell of the SCG, while the SCG is deactivated. The beam failure may be detected, if BFI_counter is above or equal to beamFailureInstanceMaxCount. The time alignment timer (TAT) associated with the at least one cell is triggered 602, or caused, to expire upon detecting the beam failure, while the SCG is deactivated. In other words, the TAT is expired upon detecting the beam failure in the SCG deactivated state, without waiting for the SCG activation.

Figure 7:
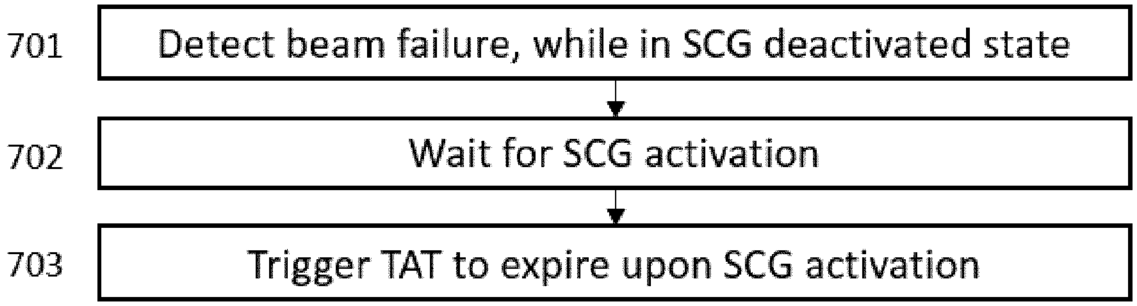

FIG. 7 illustrates a flow chart according to an exemplary embodiment, wherein the UE waits for the SCG activation before triggering the TAT to expire after detecting a beam failure in the SCG deactivated state. Thus, the UE may be forced to perform a random-access procedure with the serving cell of the SCG upon SCG activation, since the TAT is considered to be expired upon SCG activation. The functions illustrated in FIG. 7 may be performed by an apparatus such as, or comprised in, a terminal device (e.g., the UE 203 of FIG. 2). Referring to FIG. 7, a beam failure is detected 701 on the at least one cell of the SCG, while the SCG is deactivated. The beam failure may be detected, for example, if BFI_counter is above or equal to beamFailureInstanceMaxCount. The apparatus waits 702 until the SCG is activated. The time alignment timer (TAT) associated with the at least one cell is triggered 703, or caused, or considered, to expire in response to the SCG activation.

Figure 8:

FIG. 8 illustrates a flow chart according to another exemplary embodiment. The functions illustrated in FIG. 8 may be performed by an apparatus such as, or comprised in, a terminal device (e.g., the UE 203 of FIG. 2). Referring to FIG. 8, the UE stops 801 performing BFD on the at least one cell of the SCG upon expiration of the TAT. This stems from the fact that the random-access procedure has to be performed towards the SpCell upon SCG activation in any case, since the TAT is expired. Stopping performing the BFD may be dependent on whether CFRA BFR resources have been configured for the UE. In other words, in case CFRA resources, such as a dedicated preamble, are not configured, the UE may be allowed to stop performing BFD when the TAT expires. In case CFRA resources are configured, the UE may be allowed to continue performing BFD after the TAT expires.

Figure 9:

FIG. 9 illustrates a flow chart according to another exemplary embodiment. The functions illustrated in FIG. 9 may be performed by an apparatus such as, or comprised in, a terminal device (e.g., the UE 203 of FIG. 2). Referring to FIG. 9, a detected beam failure on at least one cell of a deactivated SCG is indicated 901 via the MCG, or master node. In other words, in this exemplary embodiment, upon beam failure detection on the serving cell (e.g., SpCell) of the deactivated SCG, the UE may trigger the BFR procedure via the master node. For example, the UE may indicate, via the master node/MCG, the occurrence of a beam failure and a candidate beam of the serving cell (e.g., SpCell) of the SCG. Such indication may utilize RRC signaling or lower layer signalling (e.g., downlink control information, DCI, or MAC CE) towards the master node/MCG. For example, the RRC message may be tunneled through the master node towards the secondary node, which may interpret the UE's RRC message. For example, the secondary node may determine to respond to the UE via the master node/MCG by using RRC signaling. The UE may transmit the indication upon beam failure detection on the serving cell (e.g., SpCell) of the deactivated SCG or upon activation of the SCG (i.e., upon receiving the SCG activation command or upon triggering the SCG activation by the UE itself).

Figure 10:

FIG. 10 illustrates a flow chart according to an exemplary embodiment, wherein the network configures how the UE behaves with regard to BFR and/or TAT expiration. In other words, the network may configure the UE to perform the UE action(s) described above with reference to any of FIGS. 3-9. The functions illustrated in FIG. 10 may be performed by an apparatus such as, or comprised in, a network element such as a base station (e.g., the master node 201 or secondary node 202 of FIG. 2). Referring the FIG. 10, a message indicative of a configuration for beam failure recovery associated with an SCG is transmitted 1001 to a terminal device (UE). The configuration indicates the UE to trigger, if one or more pre-defined conditions are fulfilled, a beam failure recovery procedure for at least one cell of the SCG in response to activating the SCG. The one or more pre-defined conditions may comprise, for example, at least one of the first pre-defined condition and/or the second pre-defined condition, as described above with reference to FIG. 5.

Figure 11:
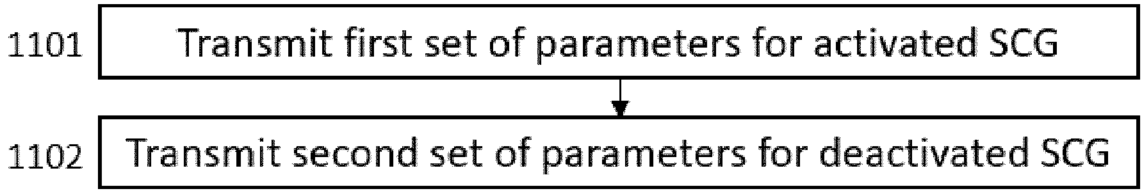

FIG. 11 illustrates a flow chart according to another exemplary embodiment, wherein BFD-related parameters, such the as beamFailureInstanceMaxCount and the beamFailureDetectionTimer, may be configured separately for the deactivated SCG compared to the activated SCG. The BFD-related parameters may also comprise one or more reference signals to be used for BFD. For example, if the BFD reference signal periodicity is different in the SCG deactivated state than in the SCG activated state, then the network may configure smaller values for the beamFailureInstanceMaxCount and the beamFailureDetectionTimer in the SCG deactivated state compared to the SCG activated state. The functions illustrated in FIG. 11 may be performed by an apparatus such as, or comprised in, a network element such as a base station (e.g., the master node 201 or secondary node 202 of FIG. 2). Referring to FIG. 11, a first set of parameters for performing beam failure detection on the at least one cell of the SCG, while the SCG is activated, is transmitted 1101 to a UE. In other words, the first set of parameters is to be used by the UE while in an SCG activated state. The first set of parameters comprises at least a first beam failure detection timer and a first beam failure instance threshold for the activated SCG. A second set of parameters for performing beam failure detection on the at least one cell of the SCG, while the SCG is deactivated, is transmitted 1102 to the UE. In other words, the second set of parameters is to be used by the UE while in an SCG deactivated state. The second set of parameters comprises at least a second beam failure detection timer and a second beam failure instance threshold for the deactivated SCG. The first set of parameters and the second set of parameters may be transmitted at the same time or they may be transmitted separately.

The functions and/or blocks described above by means of FIGS. 3-11 are in no absolute chronological order, and some of them may be performed simultaneously or in an order differing from the described one. Other functions and/or blocks may also be executed between them or within them.

In an exemplary embodiment, for a given serving cell configured for BFD, if a BFI indication has been received from lower layers, the MAC entity may start or restart a timer called beamFailureDetectionTimer, and increment BFI_COUNTER by 1. If the BFI_COUNTER is larger than or equal to beamFailureInstanceMaxCount, and if the cell group associated with this MAC entity is not deactivated or if a reconfiguration to activate the cell group associated with this MAC entity is received, then a BFR may be triggered for this serving cell, if the serving cell is an SCell. If the serving cell is not an SCell, then a random-access procedure may be initiated on the SpCell.

In another exemplary embodiment, for a given serving cell configured for BFD, if a BFI indication has been received from lower layers, the MAC entity may start or restart a timer called beamFailureDetectionTimer. If a reconfiguration to activate the cell group associated with this MAC entity is received and beam failure was detected on the SpCell, while the cell group associated with this MAC entity was deactivated, then a random-access procedure may be initiated on the SpCell. Otherwise, BFI_COUNTER is incremented by 1. If the incremented BFI_COUNTER is larger than or equal to beamFailureInstanceMaxCount, then beam failure is considered to be detected for this serving cell. If the BFI_COUNTER is larger than or equal to beamFailureInstanceMaxCount, and if the cell group associated with this MAC entity is not deactivated, then a BFR may be triggered for this serving cell, if the serving cell is an SCell. Otherwise, if the serving cell is an SpCell and the cell group associated with this MAC entity is not deactivated, a random-access procedure may be initiated on the SpCell.

A technical advantage provided by some exemplary embodiments is that they may decrease UE power consumption and network resource consumption by preventing a UE from performing a random-access procedure for BFR upon SCG activation, when the random-access procedure is not needed. If a beam failure is detected while the SCG is deactivated, the previous serving beams may have been recovered already by the UE (e.g., beamFailureDetectionTimer may have expired). An unnecessary random-access procedure can be avoided upon SCG activation in case TAT is still running and one or more beams have been recovered after beam failure.

Figure 12:
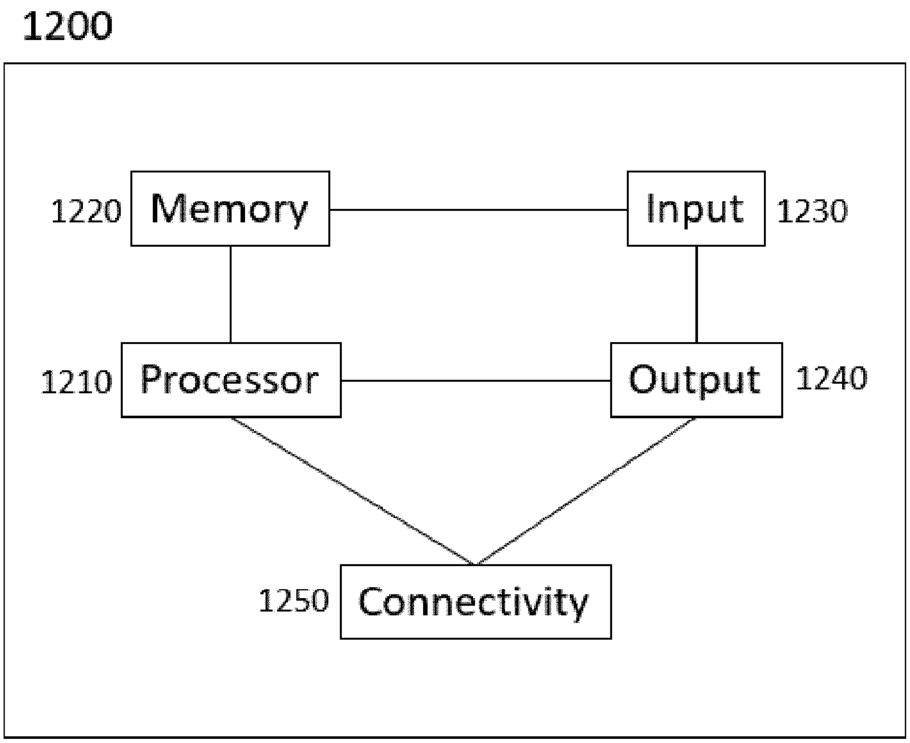
FIGS. 12-13 illustrate apparatuses according to some exemplary embodiments.

FIG. 12 illustrates an apparatus 1200, which may be an apparatus such as, or comprised in, a terminal device, according to an exemplary embodiment. A terminal device may also be referred to as a UE or user equipment herein. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been prestored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
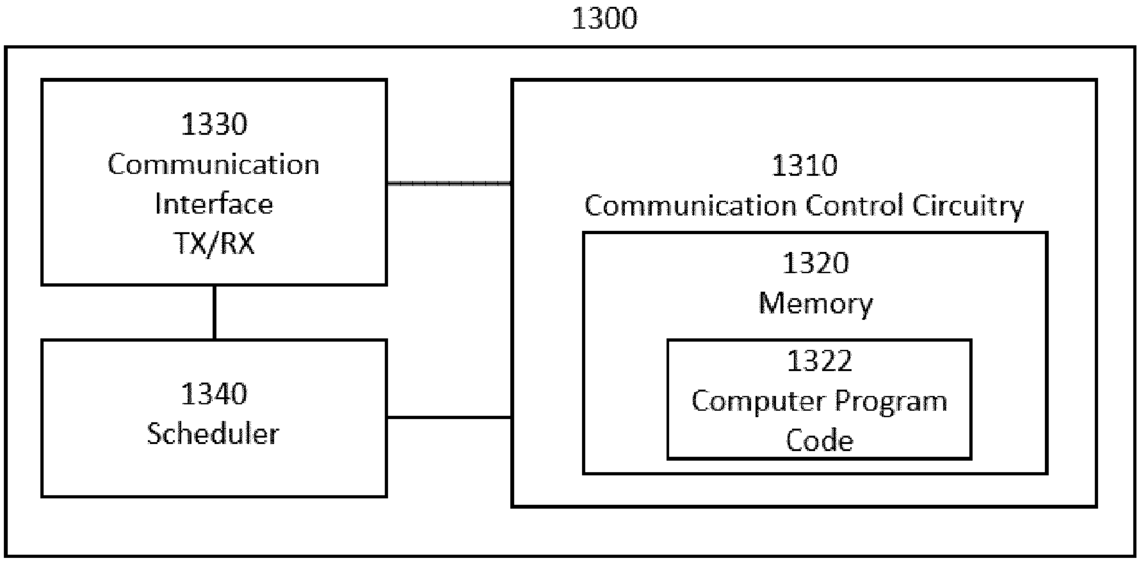

The apparatus 1300 of FIG. 13 illustrates an exemplary embodiment of an apparatus such as, or comprised in, a base station. The base station may be referred to, for example, as a network element, a RAN node, a master node, a secondary node, a NodeB, an LTE evolved NodeB (eNB), a gNB, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP). The apparatus may comprise, for example, a circuitry or a chipset applicable to a base station for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out some of the exemplary embodiments described above.

The processor is coupled to the memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor. For example, non-volatile memory stores the computer readable instructions and the processor executes the instructions using volatile memory for temporary storage of data and/or instructions.

The computer readable instructions may have been prestored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (TX) and at least one receiver (RX) that may be integrated to the apparatus 1300 or that the apparatus 1300 may be connected to. The communication interface 1330 provides the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

In the following some examples of the present solution are described.

Example 1: an apparatus comprising at least one processor, and at least one memory including computer program code, wherein the at least one memory and the computer program code are configured, with the at least one processor, to cause the apparatus to: trigger, in response to activating a secondary cell group, if one or more pre-defined conditions are fulfilled, a beam failure recovery procedure for at least one cell of the secondary cell group.

Example 2: the apparatus of example 1, wherein the one or more pre-defined conditions comprise at least one of a first pre-defined condition, a second pre-defined condition; wherein the first pre-defined condition is fulfilled, if a beam failure instance counter associated with the at least one cell is above or equal to a beam failure instance threshold upon activating the secondary cell group; wherein the second pre-defined condition is fulfilled, if a beam failure detection timer associated with the at least one cell is running upon activating the secondary cell group.

Example 3: the apparatus of example 2, wherein the second pre-defined condition is fulfilled, if a beam failure is detected on the at least one cell while the secondary cell group is deactivated, and the beam failure detection timer is running upon activating the secondary cell group.

Example 4: an apparatus according to any of examples 2-3, wherein the apparatus is further caused to: determine that the beam failure instance counter is above or equal to the beam failure instance threshold, while the secondary cell group is deactivated; and wait until activating the secondary cell group before triggering the beam failure recovery procedure.

Example 5: An apparatus according to any preceding example 1-4, wherein the apparatus is further caused to: detect a beam failure on the at least one cell, while the secondary cell group is deactivated; and trigger a time alignment timer associated with the at least one cell to expire upon detecting the beam failure, while the secondary cell group is deactivated.

Example 6: an apparatus according to any of examples 1-4, wherein the apparatus is further caused to: detect a beam failure on the at least one cell, while the secondary cell group is deactivated; and trigger a time alignment timer associated with the at least one cell to expire in response to activating the secondary cell group.

Example 7: an apparatus according to any of examples 5-6, wherein the apparatus is further caused to: stop performing beam failure detection on the at least one cell, when the time alignment timer expires.

Example 8: an apparatus according to example 7, wherein the beam failure detection is stopped when the time alignment timer expires, if no contention-free random-access resources are configured.

Example 9: an apparatus according to any preceding example 1-8, wherein the apparatus is further caused to: indicate, via a master cell group, a detected beam failure on the at least one cell of the secondary cell group.

Example 10: an apparatus according to any preceding example 1-9, wherein the apparatus is further caused to: activate the secondary cell group in response to an indication received from a network element of a wireless communication network, or in response to an internal trigger.

Example 11: an apparatus comprising at least one processor, and at least one memory including computer program code, wherein the at least one memory and the computer program code are configured, with the at least one processor, to cause the apparatus to: transmit, to a terminal device, a message indicative of a configuration for beam failure recovery associated with a secondary cell group; wherein the configuration indicates to trigger, if one or more pre-defined conditions are fulfilled, a beam failure recovery procedure for at least one cell of the secondary cell group in response to activating the secondary cell group.

Example 12: an apparatus according to example 11, wherein the one or more pre-defined conditions comprise at least one of a first pre-defined condition, a second pre-defined condition; wherein the first pre-defined condition is fulfilled, if a beam failure instance counter associated with the at least one cell is above or equal to a first beam failure instance threshold upon activating the secondary cell group; wherein the second pre-defined condition is fulfilled, if a first beam failure detection timer associated with the at least one cell is running upon activating the secondary cell group.

Example 13: an apparatus according to example 12, wherein the second pre-defined condition is fulfilled, if a beam failure is detected on the at least one cell, while the secondary cell group is deactivated, and the first beam failure detection timer is running upon activating the secondary cell group.

Example 14: an apparatus according to any of examples 11-13, wherein the configuration further indicates to cause a time alignment timer to expire upon detecting a beam failure on the at least one cell, while the secondary cell group is deactivated.

Example 15: an apparatus according to any of examples 11-13, wherein the configuration further indicates to cause a time alignment timer to expire upon activating the secondary cell group, if a beam failure is detected on the at least one cell while the secondary cell group is deactivated.

Example 16: an apparatus according to any of examples 11-15, wherein the apparatus is further caused to: transmit, to the terminal device, a first set of parameters for performing beam failure detection on the at least one cell while the secondary cell group is activated, wherein the first set of parameters comprises at least the first beam failure detection timer and the first beam failure instance threshold; and transmit, to the terminal device, a second set of parameters for performing beam failure detection on the at least one cell while the secondary cell group is deactivated, wherein the second set of parameters comprises at least a second beam failure detection timer and a second beam failure instance threshold.

Example 17: an apparatus according to any preceding example 11-16, wherein the at least one cell comprises at least one of a special cell, a primary secondary cell, a secondary cell.

Example 18: a method comprising: triggering, in response to activating a secondary cell group, if one or more pre-defined conditions are fulfilled, a beam failure recovery procedure for at least one cell of the secondary cell group.

Example 19: a method comprising: transmitting, to a terminal device, a message indicative of a configuration for beam failure recovery associated with a secondary cell group; wherein the configuration indicates to trigger, if one or more pre-defined conditions are fulfilled, a beam failure recovery procedure for at least one cell of the secondary cell group in response to activating the secondary cell group.

Example 20: a computer program comprising instructions for causing an apparatus to perform at least the following: triggering, in response to activating a secondary cell group, if one or more pre-defined conditions are fulfilled, a beam failure recovery procedure for at least one cell of the secondary cell group.

Example 21: a computer program comprising instructions for causing an apparatus to perform at least the following: transmitting, to a terminal device, a message indicative of a configuration for beam failure recovery associated with a secondary cell group; wherein the configuration indicates to trigger, if one or more pre-defined conditions are fulfilled, a beam failure recovery procedure for at least one cell of the secondary cell group in response to activating the secondary cell group.

Example 22: a system comprising at least a terminal device and a network element of a wireless communication network; wherein the network element is configured to: transmit, to the terminal device, a message indicative of a configuration for beam failure recovery associated with a secondary cell group; wherein the configuration indicates to trigger, if one or more pre-defined conditions are fulfilled, a beam failure recovery procedure for at least one cell of the secondary cell group in response to activating the secondary cell group; wherein the terminal device is configured to: receive, from the network element, the message indicative of the configuration; and trigger, in response to activating the secondary cell group, if the one or more pre-defined conditions are fulfilled, the beam failure recovery procedure for the at least one cell of the secondary cell group.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A communication apparatus comprising at least one processor, and at least one memory including computer program code, wherein the at least one memory and the computer program code are configured, with the at least one processor, to cause the communication apparatus to:

upon receiving a secondary cell group activation indication, determine if a value of a beam failure instance counter associated with at least one cell of a secondary cell group is above or equal to a beam failure instance threshold; and trigger, based at least on determining that the value of the beam failure instance counter associated with at least one cell of the secondary cell group is above or equal to the beam failure instance threshold, a beam failure recovery procedure for the at least one cell of the secondary cell group.

2. The communication apparatus according to claim 1, wherein the apparatus is further caused to:

trigger the beam failure recovery procedure for the at least one cell of the secondary cell group also based on determining that a beam failure detection timer associated with the at least one cell of the secondary cell group is running upon receiving the secondary cell group activation indication.

3. The communication apparatus according to claim 1, wherein the apparatus is caused to:

require that a beam failure detection timer associated with the at least one cell of the secondary cell group is running and that the value of the beam failure instance counter associated with the at least one cell of the secondary cell group is above or equal to the beam failure instance threshold upon receiving the secondary cell group activation indication to trigger the beam failure recovery procedure for the at least one cell of the secondary cell group.

4. The communication apparatus according to claim 1, wherein the apparatus is further caused to:

detect a beam failure on the at least one cell of the secondary cell group, while the secondary cell group is deactivated; and trigger a time alignment timer associated with the at least one cell of the secondary cell group to expire upon detecting the beam failure, while the secondary cell group is deactivated.

5. The communication apparatus according to claim 4, wherein the apparatus is further caused to:

stop performing beam failure detection on the at least one cell of the secondary cell group, when the time alignment timer expires.

6. The communication apparatus according to claim 5, wherein the apparatus is configured to stop the beam failure detection when the time alignment timer expires, if no contention-free random-access resources are configured.

7. The communication apparatus according to claim 1, wherein the apparatus is further caused to:

detect a beam failure on the at least one cell of the secondary cell group, while the secondary cell group is deactivated; and trigger a time alignment timer associated with the at least one cell to expire in response to receiving the secondary cell group activation indication.

8. The communication apparatus according to claim 1, wherein the apparatus is further caused to:

indicate, via a master cell group, a detected beam failure on the at least one cell of the secondary cell group.

9. The communication apparatus according to claim 1, wherein the apparatus is further caused to:

activate the secondary cell group in response to the secondary cell group activation indication received from a network element of a wireless communication network, or in response to an internal trigger.

10. The communication apparatus according to claim 1, wherein the apparatus is configured to receive the secondary cell group activation indication from a master node via a master cell group.

11. The communication apparatus according to claim 1, wherein the apparatus is configured to trigger the beam failure recovery procedure by performing Random Access, RA, procedure.

12. The communication apparatus according to claim 11, wherein the at least one cell comprises a Primary Secondary Cell, PSCell, of the secondary cell group, and wherein the apparatus is configured to trigger the beam failure recovery procedure by performing RA procedure towards the PSCell.

13. The communication apparatus according to claim 12, wherein the apparatus is configured to perform the RA procedure by transmitting a random access preamble to the PSCell.

14. A communication apparatus comprising at least one processor, and at least one memory including computer program code, wherein the at least one memory and the computer program code are configured, with the at least one processor, to cause the communication apparatus to:

transmit, to a user equipment, a message indicative of a configuration for beam failure recovery associated with a secondary cell group;

wherein the configuration indicates to determine if a value of a beam failure instance counter associated with at least one cell of the secondary cell group is above or equal to a beam failure instance threshold upon receiving a secondary cell group activation indication and, at least based on determining that a value of a beam failure instance counter associated with at least one cell of the secondary cell group is above or equal to a beam failure instance threshold, to trigger a beam failure recovery procedure for the at least one cell of the secondary cell group.

15. The communication apparatus according to claim 14, wherein the configuration further indicates to trigger the beam failure recovery procedure for the at least one cell of the secondary cell group also based on determining that a beam failure detection timer associated with the at least one cell of the secondary cell group is running upon receiving the secondary cell group activation indication.

16. The communication apparatus according to claim 14, wherein the configuration further indicates to cause a time alignment timer to expire upon detecting a beam failure on the at least one cell, while the secondary cell group is deactivated.

17. The communication apparatus according to claim 14, wherein the configuration further indicates to cause a time alignment timer to expire receiving the secondary cell group activation indication, if a beam failure is detected on the at least one cell while the secondary cell group is deactivated.

18. The communication apparatus according to claim 14, further caused to:

transmit the secondary cell group activation indication to the user equipment.

19. The communication apparatus according to claim 14, wherein the at least one cell comprises at least one of a special cell, a primary secondary cell, or a secondary cell.

20. A communication method comprising:

upon receiving a secondary cell group activation indication, determining, by a user equipment, if a value of a beam failure instance counter associated with at least one cell of a secondary cell group is above or equal to a beam failure instance threshold; and triggering, based at least on determining that the value of the beam failure instance counter associated with at least one cell of the secondary cell group is above or equal to a beam failure instance threshold, a beam failure recovery procedure for the at least one cell of the secondary cell group.

21. A communication method comprising:

transmitting, to a user equipment by a network element, a message indicative of a configuration for beam failure recovery associated with a secondary cell group;

wherein the configuration indicates to determine if a value of a beam failure instance counter associated with at least one cell of the secondary cell group is above or equal to a beam failure instance threshold upon receiving a secondary cell group activation indication and, at least based on determining that a value of a beam failure instance counter associated with at least one cell of a secondary cell group is above or equal to a beam failure instance threshold, to trigger a beam failure recovery procedure for the at least one cell of the secondary cell group.

22. A non-transitory computer readable storage medium comprising computer program instructions for causing an apparatus to perform at least the following:

upon receiving a secondary cell group activation indication, determining if a value of a beam failure instance counter associated with at least one cell of a secondary cell group is above or equal to a beam failure instance threshold; and triggering, based at least on determining that the value of the beam failure instance counter associated with at least one cell of the secondary cell group is above or equal to a beam failure instance threshold, a beam failure recovery procedure for the at least one cell of the secondary cell group.

23. A non-transitory computer readable storage medium comprising computer program instructions for causing an apparatus to perform at least the following:

transmitting, to a user equipment device, a message indicative of a configuration for beam failure recovery associated with a secondary cell group;

wherein the configuration indicates to determine if a value of a beam failure instance counter associated with at least one cell of the secondary cell group is above or equal to a beam failure instance threshold upon receiving a secondary cell group activation indication and, at least based on determining that a value of a beam failure instance counter associated with at least one cell of a secondary cell group is above or equal to a beam failure instance threshold, to trigger a beam failure recovery procedure for the at least one cell of the secondary cell group.

* * * * *